United States Patent
Ray et al.

(10) Patent No.: US 7,318,857 B2
(45) Date of Patent: Jan. 15, 2008

(54) DUAL FLOW WET ELECTROSTATIC PRECIPITATOR

(75) Inventors: Isaac Ray, Brooklyn, NY (US); Mark A. West, Deerfield, IL (US); Boris Altshuler, North Miami Beach, FL (US)

(73) Assignee: Eisenmann Corporation, Crystal Lake, IL (US)

( * ) Notice: Subject to any disclaimer, the term of this patent is extended or adjusted under 35 U.S.C. 154(b) by 0 days.

(21) Appl. No.: 11/366,274

(22) Filed: Mar. 2, 2006

(65) Prior Publication Data

US 2006/0261265 A1    Nov. 23, 2006

Related U.S. Application Data

(60) Provisional application No. 60/657,901, filed on Mar. 2, 2005.

(51) Int. Cl.
*B03C 3/014*    (2006.01)
(52) U.S. Cl. .................. 96/44; 96/47; 96/48; 96/50; 96/53; 96/64; 96/80
(58) Field of Classification Search .......... 96/44–50, 96/52, 53, 80, 98–100, 60, 64; 95/64–66, 95/71, 72, 75; 55/DIG. 38
See application file for complete search history.

(56) References Cited

U.S. PATENT DOCUMENTS

| | | |
|---|---|---|
| 1,250,088 A | 12/1917 | Burns |
| 1,329,817 A | 2/1920 | Wolcott |
| 1,444,627 A | 2/1923 | Meston |
| 1,766,422 A | 6/1930 | Wintermute et al. |
| 1,811,797 A * | 6/1931 | Lechler ............... 423/522 |
| 1,951,867 A | 3/1934 | Grilli |
| 2,024,226 A * | 12/1935 | Irwin et al. ............... 96/53 |
| 2,055,368 A | 9/1936 | Shively |
| 2,195,431 A | 4/1940 | Shively et al. |

(Continued)

FOREIGN PATENT DOCUMENTS

GB    401 566 A    11/1933

(Continued)

OTHER PUBLICATIONS

Bump, "Electrostatic precipitators in industry," Chemical Engineering, pp. 129-136 (Jan. 17, 1977).

(Continued)

*Primary Examiner*—Richard L. Chiesa
(74) *Attorney, Agent, or Firm*—Drinker Biddle & Reath LLP

(57) ABSTRACT

An apparatus for removing particulate matter from a gas stream containing particular matter, the apparatus comprising: a mist-producing element that mixes a gas stream entering the apparatus with liquid droplets; a down-flow Wet Electrostatic Precipitator (WESP) section comprising ionizing electrodes that electrically charge the particulate matter and the intermixed liquid droplets, and collecting surfaces under the influence of an electrical field which attract and remove electrically-charged particulate matter and intermixed liquid droplets from the gas stream; and an up-flow WESP section comprising electrically-charged ionizing and collecting electrodes that remove, from the gas stream, substantially all fine-sized droplets generated in the down-flow WESP section.

7 Claims, 2 Drawing Sheets

U.S. PATENT DOCUMENTS

| | | | |
|---|---|---|---|
| 2,273,194 A * | 2/1942 | Hedberg et al. | 95/66 |
| 2,422,564 A | 6/1947 | Pegg | |
| 2,443,780 A | 6/1948 | Wintermute | |
| 2,592,508 A | 4/1952 | Phyl | |
| 2,677,439 A | 5/1954 | Hedberg | |
| 2,701,028 A | 2/1955 | Eilenberger | |
| 2,800,192 A | 7/1957 | Roberts | |
| 2,874,802 A | 2/1959 | Gustafsson et al. | |
| 2,937,709 A | 5/1960 | De Seversky | |
| 3,029,578 A | 4/1962 | Wiemer et al. | |
| 3,124,437 A | 3/1964 | Lagarias | |
| 3,248,857 A | 5/1966 | Weindel et al. | |
| 3,400,513 A * | 9/1968 | Boll | 96/17 |
| 3,444,668 A | 5/1969 | Masuda | |
| 3,656,441 A * | 4/1972 | Grey et al. | 110/215 |
| 3,765,154 A | 10/1973 | Hardt et al. | |
| 3,831,351 A | 8/1974 | Gibbs et al. | |
| 3,874,858 A * | 4/1975 | Klugman et al. | 96/47 |
| 3,958,958 A * | 5/1976 | Klugman et al. | 95/64 |
| 3,958,960 A | 5/1976 | Bakke | |
| 3,958,961 A | 5/1976 | Bakke | |
| 4,049,399 A * | 9/1977 | Teller | 95/36 |
| 4,072,477 A | 2/1978 | Hanson et al. | |
| 4,256,468 A | 3/1981 | Mazer et al. | |
| 4,355,108 A | 10/1982 | Gaddy et al. | |
| 4,441,897 A | 4/1984 | Young et al. | |
| 4,516,991 A | 5/1985 | Kawashima | |
| 4,523,928 A | 6/1985 | Hillman et al. | |
| 4,844,723 A | 7/1989 | Tellini et al. | |
| 4,870,045 A | 9/1989 | Gasper et al. | |
| 5,039,318 A | 8/1991 | Johansson | |
| 5,084,072 A * | 1/1992 | Reynolds | 95/65 |
| 5,137,546 A | 8/1992 | Steinbacher et al. | |
| 5,154,734 A * | 10/1992 | Yung | 95/8 |
| 5,254,155 A | 10/1993 | Mensi | |
| 5,624,476 A | 4/1997 | Eyraud | |
| 6,117,403 A * | 9/2000 | Alix et al. | 423/210 |
| 6,132,692 A | 10/2000 | Alix et al. | |
| 6,224,653 B1 * | 5/2001 | Shvedchikov et al. | 95/58 |
| 6,231,643 B1 | 5/2001 | Pasic et al. | |
| 6,294,003 B1 | 9/2001 | Ray | |
| 6,302,945 B1 | 10/2001 | Altman et al. | |
| 6,558,454 B1 | 5/2003 | Chang et al. | |
| 6,649,132 B1 | 11/2003 | Hwang et al. | |
| 2002/0061270 A1 | 5/2002 | Osborne | |
| 2002/0164730 A1 | 11/2002 | Ballesteros Perdices et al. | |
| 2004/0040438 A1 | 3/2004 | Baldrey et al. | |
| 2004/0121436 A1 | 6/2004 | Blount | |
| 2005/0112056 A1 | 5/2005 | Hampden-Smith et al. | |
| 2005/0220695 A1 | 10/2005 | Abatzoglou et al. | |

FOREIGN PATENT DOCUMENTS

| | | | |
|---|---|---|---|
| GB | 1 600 232 A | 10/1981 | |
| JP | 52-3767 A * | 1/1977 | 96/49 |
| RU | 2 189 866 C1 | 9/2002 | |

OTHER PUBLICATIONS

Jaasund et al., "Taking charge," www.eponline.com, pp. 58-61 (Apr. 2000).

Klingspor et al., "Multi-pollutant Control Capabilities of the Double Contact Flow Scurbber," Power Industry Services, ADVANTECH™, pp. 1-9 (believed to be after Aug. 2004).

Steinsvaag, "Overview of Electrostatic Precipitators," Plant Engineering, File 7550, pp. 88-90 (Jul. 10, 1995).

* cited by examiner

DUAL FLOW WET ELECTROSTATIC PRECIPITATOR

CROSS-REFERENCE TO RELATED APPLICATIONS

This patent application claims the benefit of U.S. Provisional Patent Application No. 60/657,901 filed Mar. 2, 2005.

FIELD OF THE INVENTION

This invention pertains to a Wet Electrostatic Precipitator (WESP) apparatus and method for removing particulate matter and toxic gases from a gas stream. The invention also pertains to an apparatus having the capacity to continuously self-clean collected particulate matter from a collecting surface while minimizing or eliminating the amount of fine mist exiting the apparatus.

BACKGROUND OF THE INVENTION

There have been continuing attempts to improve techniques for removing fine particulates from gas streams. Among the recent improvements is the utilization of condensing wet electrostatic precipitators wherein the particulates carried by an incoming gas stream are entrained in condensate formed on walls of the precipitator and are flushed from the walls for collection. Also known is a down-flow type of WESP in which the water droplets move concurrently with the gas and provide a cleaning action when deposited together with particles.

Despite such improvements, however, there remains a need for an improved apparatus and methods for eliminating all or substantially all of a particulate matter from a gas stream. This invention seeks to provide such an apparatus. These and other advantages of the invention, as well as additional inventive features, will be apparent from the description of the invention provided herein.

BRIEF SUMMARY OF THE INVENTION

The invention provides an apparatus for removing particulate matter and toxic gases from a gas stream containing particulate matter. The apparatus is comprised of: a mist-producing device that mixes a gas stream entering the apparatus with liquid droplets; a down-flow Wet Electrostatic Precipitator (WESP) section comprising ionizing electrodes that electrically charge the particulate matter and the intermixed liquid droplets; collecting surfaces that are under the influence of an electrical field and therefore attract and remove electrically-charged particulate matter and intermixed liquid droplets from the gas stream; a scrubbing section and an up-flow WESP section comprising electrically-charged ionizing and collecting electrodes that remove, from the gas stream, substantially all fine-sized droplets generated in the down-flow WESP section and scrubbing section.

BRIEF DESCRIPTION OF THE DRAWINGS

FIG. 1A is an enlarged view of the connection between charging stage and the repelling stage of an ionizing electrode used in the down-flow WESP section of the present invention.

FIG. 1B is an enlarged view of the connection between charging stage and the repelling stage of an ionizing electrode used in the up-flow WESP section of the present invention.

DETAILED DESCRIPTION OF THE INVENTION

Figure 1:
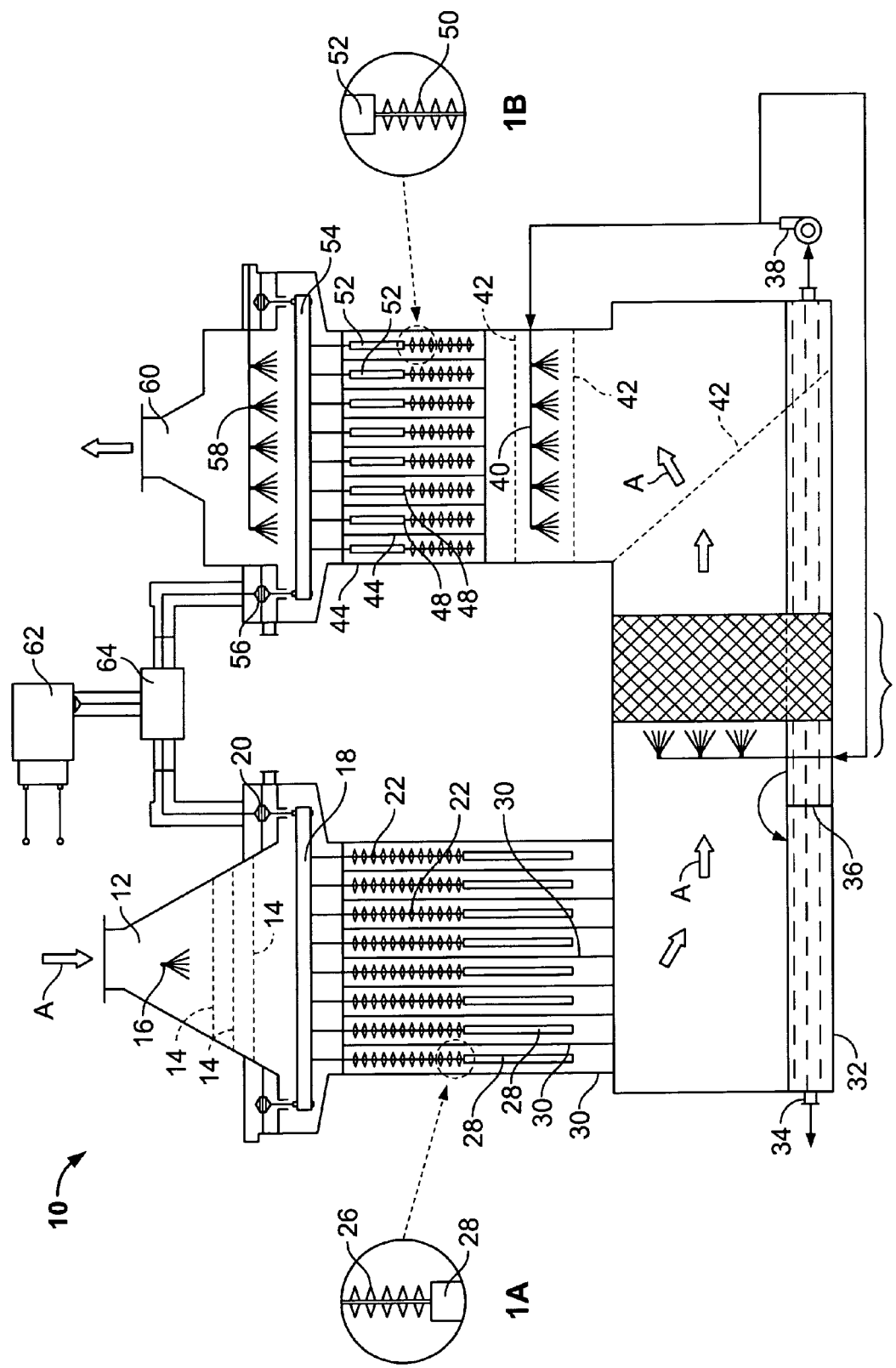
FIG. 1 is a longitudinal, cross-sectional view of an apparatus constructed in accordance with an embodiment of the present invention in which a common power source is used.

The invention, as shown in FIG. 1, involves an apparatus 10 comprised of an inlet transition 12 that includes a gas distribution perforated plate 14 and a fine liquid mist nozzle 16 located downstream of, and proximal to the inlet 12. A support structure 18 for ionizing electrodes is positioned downstream of the distribution plate 14. Support insulators 20 isolate negative ionizing electrodes from positive tubes while ionizing electrodes 22, having a charging stage with sharp corona generating points 26 and a smooth repelling stage 28, as shown in FIG. 1A, extend from the support structure 18.

The ionizing electrodes 22 are preferably located centrally in the spaces defined by collecting surfaces 30 ("collectors"). These collecting surfaces 30 can be created by tubular or flat plate structures. Located below the collectors 30, and preferably in the bottom of a housing 32 is a sump for the down-flow section for collecting liquid. A drain nozzle 34 is also located in the vicinity of the sump.

Figure 2:
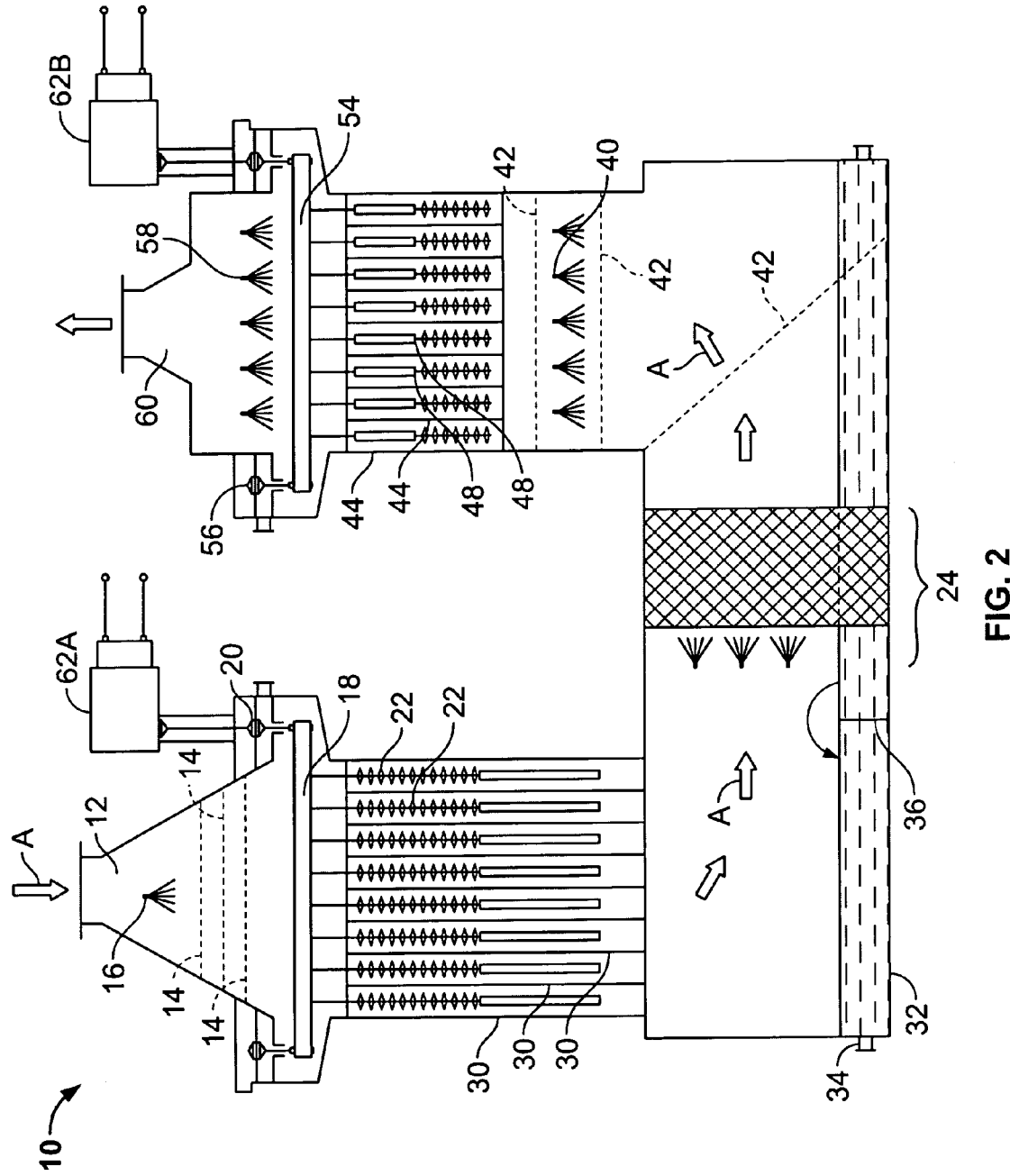
FIG. 2 is a longitudinal, cross-sectional view of an apparatus constructed in accordance with an embodiment of the present invention in which two separate power sources are used.

In one embodiment, the sump in the bottom of the housing 32 is separated by a dividing wall 36, in order to create a separate sump for the up-flow section and a recycle pump 38. Above the sump for the up-flow section are washing spray nozzles 40, which are followed by gas distribution plates 42, which are followed by ionizing electrodes 48 which include ionizing points 50 and a repelling stage 52, as shown in FIG. 1B. Juxtaposed around the ionizing electrodes 48 are up-flow WESP collectors 44. These collectors 44 may be of a hexagonal shape. The ionizing electrodes 48 of the up-flow section can be supported by the frame 54 and insulators 56. Wash nozzles 58 are preferably located above the frame 54. An outlet transition 60 is located downstream of the wash nozzles 58. High voltage power is supplied by a power supply 62. Moreover, one of the WESP units can be turned on or off, as required, using a high voltage switch 64. This high voltage switch 64 also incorporates high voltage diodes which prevent the sparking in the down-flow section from influencing the operation of the up-flow section. In the event the inlet gas contains high concentrations of submicron particles (i.e., more than 0.2 gr/acf for particles below 0.5 micron) that can create so-called corona current suppression, each section of the WESP will be powered by separate power supplies 62A and 62B as shown in FIG. 2.

When in operation, an incoming gas stream "A" laden with solid particulates and acidic gases enters the inlet transition 12 that incorporates perforated plates 14 for gas distribution and the mist nozzle 16 that sprays a fine liquid mist onto the gas. Upon entering the down-flow WESP section, the solid particles along with the liquid droplets are charged in an ionizing stage, where the sharp points 26 create the flow of the negative ions. Under the influence of the electrical field, the charged particles and droplets migrate together towards the collecting surfaces 30. The collection process is most effective in the repelling stage, where the high voltage field is uniform between the collecting walls 30 and repeller 28.

During the operation, most of the sparking and arcing caused by the charged particles passing through the electrical field take place between the sharp points 26 of the ionizing electrodes 22 and the walls of the collector 30, with practically no sparking taking place in the space between the smooth repeller 28 and the collector walls 30. This minimizes the production of small droplets, thereby reducing the amount of extra energy required to capture them in the up-flow section of the apparatus 10. It has been found that the greatest amount of ionizing current produced by the given length of the electrode takes place when the distance between two of the sharp points 26 is approximately half the distance from the end of the point to the closest collection wall. Furthermore, it has been found that the most efficient collection takes place when the diameter of the repeller 28 is ⅓ of the diameter of the collecting tube.

The mixture of collected particles and water droplets moves substantially continuously downwards under the forces of gravity until they collect in the sump where they are drained out through the drain nozzle 34. In still another embodiment of the invention, the down-flow WESP section may have only an ionizing stage while the up-flow WESP section has only a collecting stage on their respective electrodes 22, 48 in order to maximize the potential of each section. It has been found that the best charging occurs when high pulsed voltage is passed through the sharp points 26 of the ionizing electrodes 22. Likewise, the best collection occurs when a uniformed electrical field of smooth voltage passes through the repeller 28. Therefore, in order to have an ionizing only stage in the down-flow WESP section, the section is supplied with a high pulsed voltage while a uniformed smooth voltage is supplied to the up-flow WESP section so as to allow for collection only in that section.

During the operation, the gas A changes direction by about 90° at the bottom of the down-flow WESP section of the apparatus 10, as shown in FIGS. 1 and 2. This change of direction helps to separate big water droplets (e.g., more than 100 microns) from the gas stream A by allowing the big droplets to drop from the down-flow WESP collector. Furthermore, the gas, along with the solid particles and smaller droplets that penetrated the down-flow WESP section, again change direction by about 90° above the sump, moves through the scrubbing section 24 and enters into the up-flow WESP section of the apparatus 10. As a result of this flow pattern, the gas flow A makes a total change of direction of about 180° degrees above the common sump. In order to provide an even gas flow velocity in the cross section of the up-flow WESP section, following the 90° turn above the sump, the gas A enters additional scrubbing and gas distribution sections that have several perforated plates 42.

The moving gas A enters the gas scrubbing section 24 which is comprised of scrubbing elements, spray nozzles, a separate recycle liquid loop, and a gas entering distribution section 42, where the liquid from the sprays 40 and turbulent gas flow creates a small pressure drop and, as a result, better gas velocity distribution in addition to the acidic gas scrubbing action, particularly when sprays 40 and 24 contain an alkali solution.

The particles and liquid droplets that still remain in the gas flow enter the up-flow WESP section and, preferably charged by the corona, discharge between the ionizing points 50 and walls of the collector 44. When charged particles and droplets enter the space between the collector 44 and repeller 52, high efficiency collection takes place. Furthermore, since there are more fine liquid droplets than particles in this section the continuous self-cleaning action also takes place.

In another embodiment, the space between the down-flow and up-flow WESP sections of housing 32 of the apparatus 10 may comprise additional gas scrubbing devices, such as packing, venturi, spray, rod decks and other with a separate recycle loop to remove various acid gases from a gas stream A. Scrubber designs depend on the specific inlet gas conditions including the types of acidic gases, their concentrations, and the required removal efficiency. In a case in which the inlet gas contains solids particles only, the scrubbing section is not required.

It is preferable that all, or substantially all, of the particulate matter and water droplets that exit the down-flow WESP section are charged and are removed by the grounded scrubbing section 24 and by the up-flow WESP section. In this regard, most of the solid particles are removed from the gas flow A in the down-flow WESP section. The mixture of the gas with the fine liquid droplets (generated in the WESP by sparking and arcing), along with fine scrubbing liquid droplets that have originated along the gas path in the apparatus 10, enters the up-flow WESP section for final removal of submicron particles that have penetrated the down-flow WESP section and acid gas scrubbing section 24.

Since there may be more liquid droplets than solids on a mass basis in the up-flow WESP section, the problem of contamination is overcome in addition to the complete and final mist elimination. Moreover, the fine droplets (e.g., of a size of less than about 10 microns, 5 microns, or even less than about 1 micron) which are generated by down-flow WESP section have the same or substantially the same diameter as solids particles and will be removed by the up-flow WESP section in the same or substantially the same part or portion of the collector area. This effect provides the continuous WESP washing and minimizes the sedimentation of solid particles on the upper dry surface of WESP collector as it takes place in the conventional up-flow WESP.

In accordance with an embodiment of the present invention, down-flow and up-flow sections of the WESP are preferably located in a common housing 32, have a common sump, and/or can share a common high voltage power supply 62, as shown in FIG. 1. Each WESP section may also use separate power supplies 62A and 62B, as shown in FIG. 2, that are adjusted accordingly to maximize the charging in the down-flow section and collection in the up-flow section.

In accordance with another embodiment of the present invention, if the level of so-called Corona Current Suppression has begun to influence WESP efficiency, each of the WESP section is equipped with its own power supply 62A, 62B, as shown in FIG. 2, which will be selected according to the required operating voltage and current, in a manner known to those of skill in the art.

In still another embodiment of the invention, each of the WESP sections can be constructed as tubular or plate type and a liquid delivery method on the collecting surface 30 can be either as a fog from the spray nozzles 16 or as a liquid film with constant liquid delivery rate.

In accordance with another embodiment of the present invention, the down-flow section of the WESP is a wet non-thermal plasma generator that is connected to a high voltage power supply that provides fast rising and short duration pulsed voltage with characteristics defined in a manner known to those of skill in the art. Non-thermal plasma, in this regard, can convert, for example, nitrous oxide (NO) into a soluble compound like nitrous dioxide ($NO_2$) that will be scrubbed in the following scrubbing section, or can convert the elemental mercury to mercury oxide solids which can be removed by up-flow WESP. In this manner, the apparatus 10 can function as a multi-pollutant control system.

The apparatus 10 of the present invention provides for extremely reliable and highly efficient wet particulate removal, while eliminating problems associated with conventional apparatuses, such as, for example, the presence of contaminated fine mist (e.g., droplets smaller than 15 microns in diameter) that are mainly responsible for the penetration from the conventional mist eliminator that follows the gas flow exiting the down-flow WESP section, and the need for periodic shut-downs for cleaning the conventional up-flow WESP section due to the contamination of the dry top of the collector resulting from large droplets which are bigger than particles not reaching the top.

As shown in FIG. 1, the invention also involves an apparatus 10 for removing particulate matter and scrubbing toxic gases from a gas stream A, the apparatus 10 is comprised of a gas inlet 12 for a down-flow section of a WESP, at least one mist-producing device 16 located within the gas inlet 12, a gas distribution plate 14 downstream of the at least one mist-producing device 16, a plurality of ionizing electrodes 22 located in a collection section 30 positioned downstream of the at least one mist-producing device 16, a repelling section 28 located on each of the plurality of ionizing electrodes 22, a sump located downstream of the collection section 30, a plurality of spray nozzles 40 located downstream of the sump in an up-flow section of a WESP, a gas distribution plate 42 downstream of the plurality of spray nozzles 40, a plurality of collecting surfaces 44 downstream of the gas distribution plate 42, an ionizing electrode 48 located within each of the plurality of collecting surfaces 44, at least one wash nozzle 58 positioned downstream of the ionizing electrodes 48, a gas outlet 60 downstream of the at least one wash nozzle 58, and a power source 62 electrically connected to the apparatus 10.

In one embodiment of the invention, a scrubbing section 24 is located in the sump upstream of the plurality of spray nozzles 40.

The invention also involves a method for removing particulate matter and toxic gases from a gas stream, the method is comprised of: (1) introducing a contaminated gas stream into a housing; (2) spraying a fine liquid mist into the contaminated gas stream; (3) electrically charging particulates and droplets in the gas stream by passing the gas stream by at least one ionizing electrode; (4) collecting the electrically charged particulates and droplets on a collecting surface; (5) draining the collected electrically charged particulates and droplets into a sump; (6) flowing the gas stream upward; (7) spraying a fine liquid mist into the contaminated gas stream; (8) electrically charging particulates and droplets in the gas stream by passing the gas stream by at least one ionizing electrode; and (9) collecting charged particles and droplets on the collecting surfaces and discharging the gas stream through an outlet.

In another embodiment of the method, the gas stream is chemically scrubbed prior to flowing upward from the sump. In a specific version of this embodiment, the chemical scrubbing is accomplished using an alkaline solution.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for removing particulate matter and scrubbing toxic gases from a gas stream, the apparatus comprising:
   a mist-producing device that sprays liquid droplets into the gas stream;
   a down-flow Wet Electrostatic Precipitator (WESP) section comprised of a plurality of ionizing and collecting electrodes;
   an up-flow WESP section in flow communication with the down-flow WESP section, the up-flow WESP section comprised of a plurality of ionizing and collecting electrodes; and
   a common power supply having a high voltage switch and high voltage diodes electrically connected to both the down-flow WESP section and the up-flow WESP section.

2. The apparatus of claim 1, wherein: a scrubbing section is located downstream of the down-flow WESP section and prior to the up-flow WESP, the scrubbing section having an electrically grounded gas scrubbing device.

3. The apparatus of claim 1, wherein a scrubbing section is located in a common sump between the down-flow WESP section and the up-flow WESP section.

4. The apparatus of claim 1, wherein:
   a first power supply is electrically connected to the down-flow WESP section; and
   a second power supply is electrically connected to the up-flow WESP section.

5. The apparatus of claim 4, wherein the first power supply provides fast rising and short duration high voltage pulsing for non-thermal plasma generation.

6. An apparatus for removing particulate matter and scrubbing toxic gases from a gas stream, the apparatus comprising:

a gas inlet for a down-flow section of a Wet Electrostatic Precipitator (WESP);

at least one mist-producing device located within the gas inlet;

a gas distribution plate downstream of the at least one mist-producing device;

a plurality of ionizing electrodes located in a collection section positioned downstream of the at least one mist-producing device;

a repelling section located on each of the plurality of ionizing electrodes;

a sump located downstream of the collection section;

a plurality of spray nozzles located downstream of the sump in an up-flow section of a WESP;

a second gas distribution plate downstream of the plurality of spray nozzles;

a plurality of collecting surfaces downstream of the second gas distribution plate;

an ionizing electrode located within each of the plurality of collecting surfaces;

at least one wash nozzle positioned downstream of the ionizing electrodes;

a gas outlet downstream of the at least one wash nozzle; and a power source electrically connected to the apparatus.

7. The apparatus of claim 6, wherein a scrubbing section is located in the sump upstream of the plurality of spray nozzles.

* * * * *